Oct. 20, 1964     S. H. RASKIN     3,153,460
WEIGHING APPARATUS
Filed Sept. 19, 1962     2 Sheets-Sheet 1
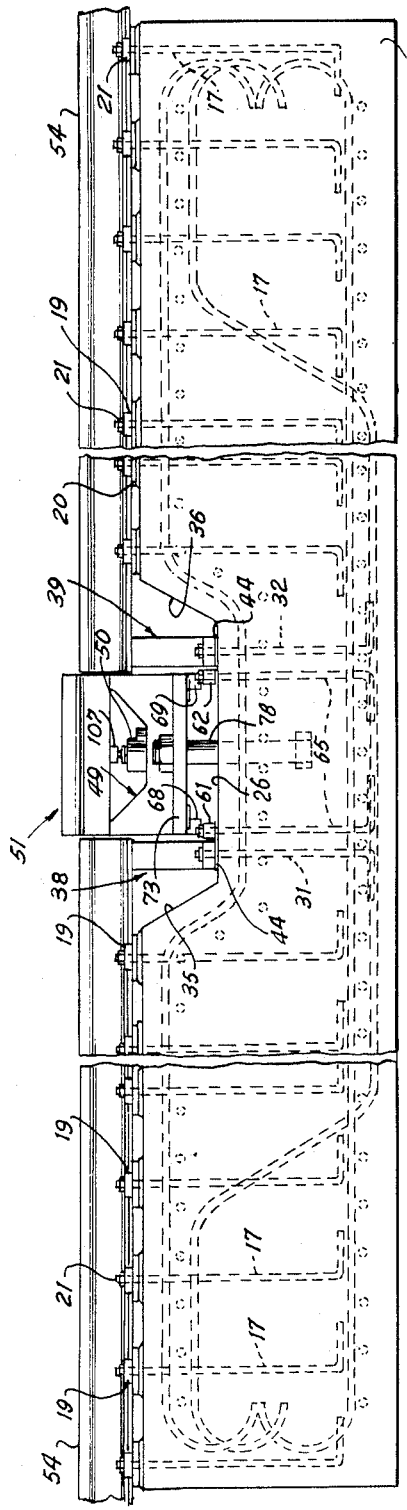
Fig.1
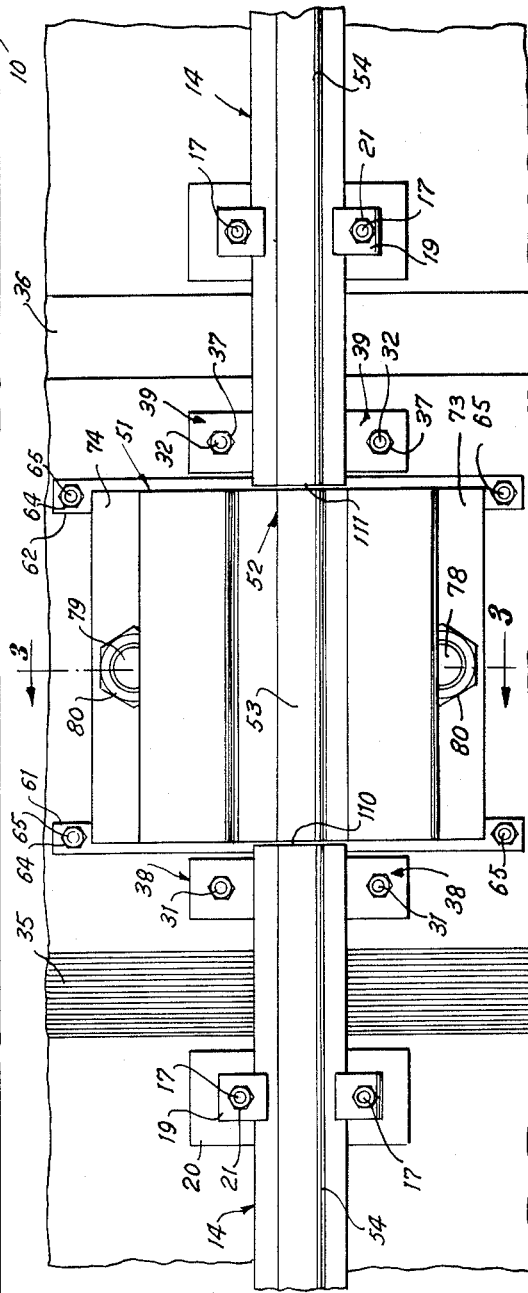
Fig.2
INVENTOR
Seymour H. Raskin
BY
ATTORNEYS Oct. 20, 1964     S. H. RASKIN     3,153,460

WEIGHING APPARATUS

Filed Sept. 19, 1962     2 Sheets-Sheet 2

INVENTOR
Seymour H. Raskin

BY

ATTORNEYS

United States Patent Office 3,153,460
Patented Oct. 20, 1964

3,153,460
WEIGHING APPARATUS
Seymour H. Raskin, Dallas, Tex., assignor to Sands Measurement Corporation, Dallas, Tex., a corporation of Texas
Filed Sept. 19, 1962, Ser. No. 224,622
10 Claims. (Cl. 177—133)

This invention relates to weighing apparatus and more particularly to weighing apparatus for weighing moving loads.

An object of the invention is to provide a new and improved apparatus for weighing moving loads, such as railroad vehicles moving over railroad tracks.

Another object is to provide a new and improved weighing device having means for rigidly securing adjacent end portions of longitudinally aligned track rails of a railroad track in alignment with a weigh rail of a weigh rail assembly disposed between adjacent spaced ends of such track rail.

Still another object of the invention is to provide a weighing device wherein the weigh rail and its supporting structure is completely out of engagement with the track rails so that expansion and contraction of such track rails will not affect the amount of deflection of the weigh rail as the load moves thereover from one track rail to the other.

A still further object is to provide a weigh rail assembly which may be secured to the base between adjacent ends of spaced track rails and which is secured to the base at longitudinally central points so that its longitudinally spaced end portions are free to move longitudinally relative to the longitudinal central portion of the rail assembly as expansion and contraction occurs due to variations in temperature.

Another object is to provide a weigh rail assembly having a support saddle to which a weigh rail is rigidly secured at its opposite end portions with the intermediate portion being free to deflect vertically downwardly as a load moves over the weigh rail and having a weigh rail deflection sensing device mounted on the saddle and in operative engagement with the weigh rail for detecting and measuring the deflection of the weigh rail.

A still further object of the invention is to provide a weigh rail assembly wherein the weigh rail is sprung or deflected upwardly to prestress the deflection sensing device to a predetermined degree.

A still further object of the invention is to provide a weigh rail assembly wherein the support saddle is provided with laterally outwardly extending straddle legs adapted to movably rest upon support bars rigidly secured to the base.

A still further object of the invention is to provide a weigh rail assembly which includes a support means or saddle, a weigh rail and a deflection sensing device wherein the components of the weigh rail assembly may be assembled at a location remote from the site of use and calibrated with the recording or computing devices to be used therewith prior to installation of the weigh rail assembly at the site of use.

Additional objects and advantages of the invention will be readily apparent from the reading of the following description of a device constructed in accordance with the invention, and reference to the accompanying drawings thereof, wherein:

FIGURE 1 is a side elevation of the weighing device embodying the invention;

FIGURE 2 is an enlarged fragmentary top view of the device set forth in FIGURE 1;

Figure 3:
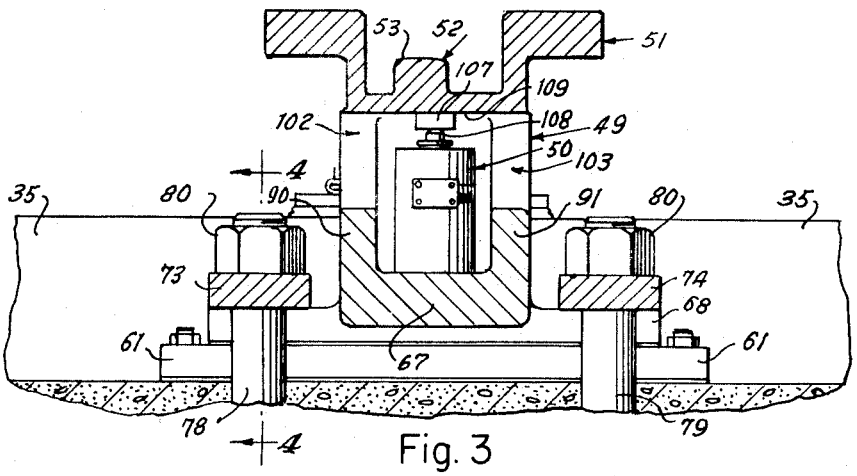
FIGURE 3 is a sectional view taken on line 3—3 of FIGURE 2.

Referring now to the drawings, the weighing device includes a concrete base 10 on which laterally spaced weigh rail assemblies 11 may be mounted in parallel relationship to constitute sections of the usual pair of parallel railroad tracks formed of the rails 14. Only one weigh rail assembly for one track is illustrated and described herein since the other weigh rail assembly is identical in structure and mounted in identically the same manner on the base.

The base 10 is provided with a plurality of studs 17 embedded in the concrete whose threaded upper ends project upwardly thereof. Rail clips 19 and spacers 20 are disposed about each of the studs 17 and are held rigidly in place by nuts 21 to hold the rail sections 14 adjacent opposite ends of the weigh rail assembly rigidly secured to the base. The base has a transverse groove or recess 25 in its upper surface which provides a flat support surface 26. Two pairs of studs 31 and 32 embedded in the concrete base have upper ends which project upwardly of the flat support surface 26 of the groove adjacent the inwardly downwardly sloping walls 35 and 36 of the groove and are provided with nuts 37 to rigidly secure the rail supports 38 and 39 to the base. The inner ends of the adjacent spaced end portions of the rails 14 project inwardly over the recess and rest on the upper support surfaces 40 of the rail supports.

Each of the rail supports has a horizontal base section 41 provided with apertures 42 through which the studs 31 or 32 extend and a substantially H-shaped column 43 which extends upwardly from the base to engage the bottom surface of the rail which it supports. Shims 44 of appropriate thickness may be interposed between the support surface 26 of the base and the base sections of the rail supports in order to position the upper support surface of the rail supports at the desired level.

Each weigh rail assembly includes a support saddle 49, a deflection detecting means 50, such as a load cell, and a weigh rail 51. The weigh rail has a rib 52 which provides a tread or support surface 53 which is at the same elevation as the treads 54 of the rails 14 and in longitudinal alignment therewith so that a vehicle wheel rolling along the rails 14 of the track will be supported by the tread of the rib 52, which substantially bridges the gap between the adjacent ends of the track rail 14, as it moves from one track rail to the other.

The weigh rail 51 is mounted on the support saddle which in turn rests on the transverse support bars 61 and 62 disposed on the flat surface 26 of the groove of the base block 10 and rigidly secured thereto by means of nuts 64 threaded on the upper ends of the studs 65. The lower portions of the studs 65 are embedded in the concrete base 10. Shims 66 may be interposed between the support bars and the flat surface 26 to cause proper vertical alignment of the tread of the weight rail with the treads of the track rails.

The support saddle 49 includes a longitudinally extending bottom 67 having straddle legs 68 and 69 which extend transversely outwardly of the ends of the bottom. The straddle legs have narrow lower planar surfaces 70 which rest on the upper surfaces of the support bars 61 and 62 and which are spaced longitudinally at the ends of the straddle to provide stability to the base.

The hold-down bars 73 and 74 have central apertures 77 through which extend the studs 78 and 79, respectively, whose lower ends are embedded in the concrete base 10.

Figure 4:
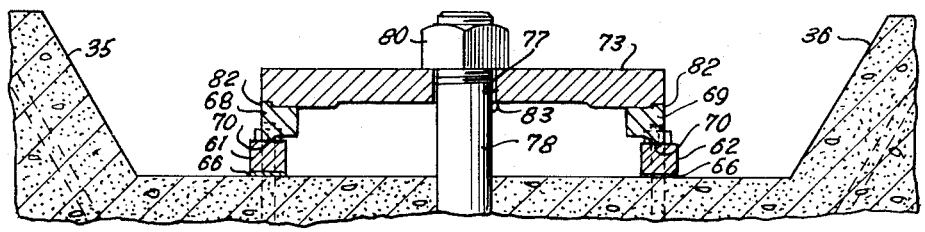
FIGURE 4 is a sectional view taken on line 4—4 of FIGURE 3.
Figure 5:
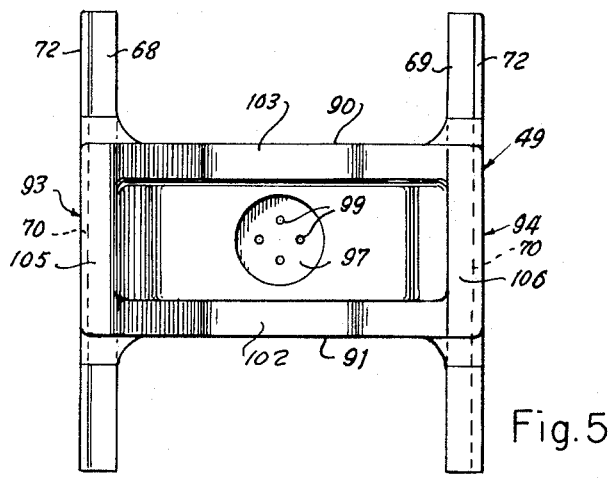
FIGURE 5 is a top plan view of the support saddle for the rail.
Figure 6:
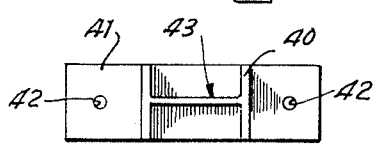
FIGURE 6 is a top plan view of a rail support of the weighing device.

The hold-down bars are secured to the base by means of the nuts 80 threaded on the upper ends of the bolts 78 and 79. Each hold-down bar is secured to the straddle legs by welds 82 at the opposite ends of the hold-down bar as seen in FIGURE 4. The studs 78 and 79 are also rigidly secured to the hold-down bars by welds 83.

It will thus be apparent that the support saddle 49 is rigidly secured to the hold-down bars at the outer ends but that the straddle legs 68 and 69 merely rest on the flat planar surfaces of the support bars 61 and 62 and are held against movement relative thereto merely by the friction therebetween.

Longitudinal movement of the longitudinal outer portions of the support saddle 49 relative to the base caused by expansion and contraction due to varying temperature conditions will be accommodated by movement of the straddle legs relative to the support bars. The support saddle, of course, cannot move as a whole since its straddle legs are secured to the hold-down bars, which in turn are secured to the studs 78 and 79 positioned centrally of the longitudinal dimension of the support saddle. Transverse or lateral movement of the outer lateral portions of the straddle legs due to expansion and contraction of the support saddle due to varying temperature conditions will also be accommodated by relative movement of the straddle legs on the support bars 61 and 62, the hold-down bars 73 and 74 bending or flexing about their central portions and the bolts 78 and 79 to permit such lateral movement of the straddle legs. The hold-down bars are preferably of the same material as the saddle so that they have the same coefficient of expansion.

It will thus be seen that while the support saddle is firmly and rigidly held in position on the base 10, the outer end portions of the legs 68 and 69 can move on the support bars both longitudinally and laterally toward and away from the hold-down studs 78 and 79.

The saddle is provided with laterally spaced side walls 90 and 91 and longitudinally spaced end walls 93 and 94 which with the bottom 67 provide a substantially rectangular open topped housing for the load cell 50 whose bottom rests on a circular flat surface 97 of the bottom 67. The load cell is secured to the bottom by any suitable means, such as bolts 98, which extend into suitable threaded bores in the bottom of the load cell 50 through suitable bores or apertures 99 of the bottom 67 of the support saddle.

The side walls 90 and 91 have upwardly opening windows or apertures 102 and 103 whose sides extend divergently upwardly to the upper ends of the end walls 93 and 94 so that opposite end portions of the weigh rail rest on the top surfaces 105 and 106 of the end walls. The weigh rail 51 is rigidly secured to the end walls 93 and 94 by welding so that its intermediate portion is free to deflect vertically.

A spacer block 107 is inserted between the upper rounded end of the stress bar 108 of the load cell 50 and the bottom surface 109 of each weigh rail 51 to spring or deflect the weigh rail upwardly and to prestress the load cell to a desired value.

It will thus be apparent that each weigh rail assembly includes a support saddle 49, the load cell 50, the weigh rail 51, which is supported by the saddle and rigidly secured thereto at opposite ends thereof so that its middle or intermediate portion is free to deflect vertically, and a spacer block 107 inserted between the weigh rail and the load cell, the load cell being centered directly below the center of gravity of the weigh rail 51 and therefore directly below the tread or support surface provided by the rib 52 of the weigh rail so that maximum downward deflection of the weigh rail occurs as the wheel passes the center of gravity of the rail and imposes a maximum stress on the load cell.

All components of the weigh rail assembly are preferably formed of the same substance, usually steel, so that the coefficients, having the same coefficients of expansion so that little, if any, differential expansion of the various parts takes place.

If desired, the spacer block may be rigidly secured to the weigh rail by weld or other suitable means. In order to precalibrate the load cell, the load cell is placed in a prestressed condition and the weigh rail is sprung or deflected upwardly when the weigh rail assembly is assembled so that the load cell of each weigh rail assembly may be calibrated with the equipment, such as a computer or weighing device or recorder which it controls at the site of assembly rather than at the site of use.

The spring or upward deflection of the rail makes certain than even if there is any differential expansion between the saddle and the weigh rail due to changes in temperatures, the weigh rail will not tend to deflect downwardly past its horizontal plane so that any expansion of the rail relative to the saddle will tend to decrease the prestress of the load cell by causing upward and not downward deflection of the intermediate portion of the weigh rail.

In use, the weigh rail assemblies 11 may be assembled at a desired location, such as a factory, and the weigh rails 51 being welded to the support saddle at their opposite ends. The spacer blocks are then inserted between the stress bar 108 of the load cell and the bottom surface 109 of the weigh rail to deflect the intermediate portion of the rail upwardly and prestress the load cell to a desired degree. The assembly may then be calibrated for use with the various computers or indicator devices with which it is to be used so that the output of the load cell is converted to a signal which varies in accordance with the load imposed on the rib 52. The precalibrated weigh rail assemblies are then taken to the location of use where they are secured to the base 10 in laterally spaced alignment and disposed between spaced adjacent ends of the rails 14 of the two parallel tracks of the railroad. The weigh rails 51 are spaced at their opposite ends from the adjacent ends of the tracks 14, to provide gaps 110 and 111, so that the rails 14 will not impose any forces upon the weigh rails 51 which might occur due to the expansion of the various rails with changes in temperature. The gaps or spaces 110 and 111 are sufficient to prevent contact between the ends of the weigh rail and the adjacent ends of the track rails 14 over the usual range of temperatures to which these rails are subjected.

The support saddle is mounted on the support bars 61 and 62 by means of its straddle legs and the hold-down bars are then placed over the upper ends of the straddle bars and the nuts 80 tightened to secure to support saddle to the base. After the ribs 52 of the weigh rails have been placed in exact alignment with the adjacent track rails 14, vertical alignment of the ribs 52 with the treads 54 of the track rails is obtained by inserting shims of appropriate thickness beneath the support bars 61 and 62. The hold-down bars are then secured to the straddle legs by means of the welds 82 at their opposite ends and to the studs 78 and 79 by the welds 83.

The portions of the track rails 14 adjacent the weigh rails 51 and placed and held in longitudinal and vertical alignment with the weigh rails due to the provision of the studs 17 and rail clamps 19 which hold these portions of the rails rigidly to the base. These portions of the track rails and the weigh rails are thus rigidly secured to the unitary solid base which thus holds the adjacent portions of the track rails and the weigh rails in exact alignment with each other. It will be apparent that if the adjacent portions of the track rails were connected merely to the usual railroad ties any shifting of the ties and the rails could cause misalignment of the track rails with the weigh rail so that the wheels of a railway car or vehicle could impose undue shocks or loads on the weigh rail due to the lateral displacement of the wheels as the wheels pass from the track rails onto the weigh rails.

It will be apparent that as the wheels of a railway vehicle roll over the track rails, the pair of wheels on each axle of the vehicle will roll from the track rails 14 onto the ribs 52 of the rails 51 of the aligned pair of weigh rail assemblies and will cause downward deflection of the weigh rails and the imposition of a load on the load cells of these weigh rail assemblies, the load varying in accordance with the weight supported by the wheels of such axle. The variations in the electrical characteristics of the load cells with the load imposed thereon cause variations in signal voltages which are employed to energize a suitable recorder or computer so that the weight supported by each wheel of each pair of wheels may be determined and recorded, indicated or otherwise utilized.

It will now be apparent that a new and improved weighing device has been illustrated and described for weighing the loads moving across a track, such as the track of a railroad, which includes a base 10 embedded in the earth and provided with means, such as the studs 17 and the rail clamps 19, for rigidly holding adjacent end portions of a pair of adjacent track rails in exact longitudinal and vertical alignment with a weigh rail of a weigh rail assembly which is also secured to and supported by the base.

It will further be seen that each weigh rail assembly includes a support saddle having a pair of longitudinally spaced, transversely extending horizontal support surfaces 105 and 106 on which opposite end portions of a weigh rail 51 rest and are rigidly secured to the support saddle by welding whereby the intermediate portion of the rail between these support surfaces 105 and 106 is free to deflect downwardly upon the imposition of a load thereon, such as is caused by the movement of a wheel of a railway vehicle as the vehicle moves from one track rail to the other across the weigh rail.

It will further be seen that each weigh rail assembly also includes a load cell supported by the saddle and operatively connected to the weigh rail by a spacer block 107 disposed between the stress bar 108 of the load cell and the bottom surface 109 of the weigh rail which deflects the intermediate portion of the weigh rail in a desired vertical direction.

It will further be seen that the support saddle has longitudinally spaced laterally outwardly extending straddle legs which rest upon support bars 61 and 62 to which they are not rigidly connected so that longitudinally spaced portions of the saddle block are free to move longitudinally inwardly and outwardly relative to one another relative to the center of the saddle, the support saddle being secured to the base by means of hold-down bars disposed on opposite sides of the saddle and secured to the straddle legs, the hold-down bars longitudinally secured to the base at their central portions by the studs 78 and 79.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A weighing device for weighing a load moving along a track rail having a gap therein including: a base; means for rigidly securing adjacent portions of the track rail at opposite sides of the gap to the base in longitudinal alignment relative to each other; a weigh rail assembly having a weigh rail; means for securing said weigh rail assembly to the base with said weigh rail disposed in said gap in longitudinal alignment with said adjacent portions and spaced from said spaced portions of said track rail whereby said weigh rail is not affected by expansion of said track rail due to temperature variations, said weigh rail being free to deflect vertically, said weigh rail assembly including a support saddle having longitudinally spaced support means extending upwardly from a substantially horizontal bottom, said weigh rail being secured at opposite ends to said support means, and means for sensing vertical deflection of said rail caused by the load and disposed between said bottom and between said longitudinally spaced support means.

2. A weighing device for weighing a load moving along a track rail having a gap therein including: a base; means for rigidly securing adjacent portions of the track rail at opposite sides of the gap to the base in longitudinal alignment relative to each other; a weigh rail assembly having a weigh rail; means for securing said weigh rail assembly to the base with said weigh rail disposed in said gap in longitudinal alignment with said adjacent portions and spaced from said spaced portions of said track rail whereby said weigh rail is not affected by expansion of said track rail due to temperature variations, said weigh rail being free to deflect vertically, said weigh rail assembly including a support saddle having longitudinally spaced support means extending upwardly from a substantially horizontal bottom, said weigh rail being secured at opposite ends to said support means, said support saddle having longitudinally spaced laterally outwardly extending straddle legs for supporting the support saddle at longitudinally spaced positions.

3. A weighing device for weighing a load moving along a track rail having a gap therein including: a base; means for rigidly securing adjacent portions of the track rail at opposite sides of the gap to the base in longitudinal alignment relative to each other; a weigh rail assembly having a weigh rail; means for securing said weigh rail assembly to the base with said weigh rail disposed in said gap in longitudinal alignment with said adjacent portions and spaced from said spaced portions of said track rail whereby said weigh rail is not affected by expansion of said track rail due to temperature variations, said weigh rail being free to deflect vertically, said weigh rail assembly including a support saddle having longitudinally spaced support means extending upwardly from a substantially horizontal bottom, said weigh rail being secured at opposite ends to said support means, said support saddle having longitudinally spaced laterally outwardly extending straddle legs for supporting the support saddle at longitudinally spaced positions, said means for securing said weigh rail assembly to the base including elongate longitudinally spaced support bars rigidly secured to said base, said straddle legs resting on said support bars, and longitudinally extending hold-down means secured to the base at the longitudinal central axis of the support saddle disposed on opposite sides of said saddle and engaging upper surfaces of said straddle legs for securing said straddle legs to said support bars.

4. A weighing device for weighing a load moving along a track rail having a gap therein including: a base; means for rigidly securing adjacent portions of the track rail at opposite sides of the gap to the base in longitudinal alignment relative to each other; a weigh rail assembly having a weigh rail; means for securing said weigh rail assembly to the base with said weigh rail disposed in said gap in longitudinal alignment with said adjacent portions and spaced from said spaced portions of said track rail whereby said weigh rail is not affected by expansion of said track rail due to temperature variations, said weigh rail being free to deflect vertically, said weigh rail assembly including a support saddle having longitudinally spaced support means extending upwardly from a substantially horizontal bottom, said weigh rail being secured at opposite ends to said support means, said support saddle having longitudinally spaced laterally outwardly extending straddle legs for supporting the support saddle at longitudinally spaced positions, said means for securing said weigh rail assembly to the base including elongate longitudinally spaced support bars rigidly secured to said base, said straddle legs resting on said support bars, and longitudinally extending hold-down means secured to the base at the longitudinal central axis of the support saddle disposed on opposite sides of said saddle and engaging upper surfaces of said straddle legs for securing said straddle legs to said support bars, said hold-down means being secured to the base by means extending upwardly from said base on opposite sides of and disposed lognitudinally centrally of said support saddle.

5. A weighing device for weighing a load moving along a track rail having a gap therein including: a base; means for rigidly securing adjacent portions of the track rail at opposite sides of the gap to the base in longitudinal alignment relative to each other; a weigh rail assembly having a weigh rail; means for securing said weigh rail assembly to the base with said weigh rail disposed in said gap in longitudinal alignment with said adjacent portions and spaced from said spaced portions of said track rail whereby said weigh rail is not affected by expansion of said track rail due to temperature variations, said weigh rail being free to deflect vertically, said weigh rail assembly including a support saddle having longitudinally spaced support means extending upwardly from a substantially horizontal bottom, said weigh rail being secured at opposite ends to said support means, said support saddle having longitudinally spaced laterally outwardly extending straddle legs for supporting the support saddle at longitudinally spaced positions, said means for securing said weigh rail assembly to the base including elongate longitudinally spaced support bars rigidly secured to said base, said straddle legs resting on said support bars, and longitudinally extending hold-down means secured to the base at the longitudinal central axis of the support saddle disposed on opposite sides of said saddle and engaging upper surfaces of said straddle legs for securing said straddle legs to said support bars, said hold-down means being secured to the base by means extending upwardly from said base on opposite sides of and disposed longitudinally centrally of said support saddle, each of said hold-down means having opposite end portions rigidly secured to the straddle legs whereby said straddle legs are free to move longitudinally relative to each other on said support bars as said support saddle and weigh rail expand and contract with changes in temperature.

6. A weighing device for weighing a load moving along a track rail having a longitudinal gap therein including: a base; means for rigidly securing portions of the track rail at opposite ends of the gap to the base in longitudinal alignment relative to each other; a weigh rail assembly having a weigh rail; and means for securing said weigh rail assembly to the base with said weigh rail disposed in said gap between said portions of said track rail whereby a load moving along the track will move from one of said portions to the other over said weigh rail, said weigh rail being free to deflect vertically, said weigh rail assembly including means for sensing vertical deflection of said rail caused by the load, said means for securing said weigh rail assembly to the base permitting longitudinal movement of opposite end portions of said weigh rail assembly from longitudinal central axis of the support saddle while preventing movement of said weigh rail assembly as a unit relative to said base.

7. A weighing device for weighing a load moving along a track rail having a gap therein including: a base; means for rigidly securing adjacent portions of the track rail at opposite sides of the gap to the base in longitudinal alignment relative to each other; a weigh rail assembly having a weigh rail; means for securing said weigh rail assembly to the base with said weigh rail disposed in said gap in longitudinal alignment with said adjacent portions and spaced from said spaced portions of said track rail whereby said weigh rail is not affected by expansion of said track rail due to temperature variations, said weigh rail being free to deflect vertically, said weigh rail assembly including a support saddle having longitudinally spaced support means extending upwardly from a substantially horizontal bottom, said weigh rail being secured at opposite ends to said support means, and means for sensing vertical deflection of said rail caused by the load including a load cell disposed between said bottom and said weigh rail and between said longitudinally spaced support means, said load cell being prestressed by vertical deflection of said rail.

8. A weigh rail assembly including: a support saddle, said support saddle having longitudinally spaced support means extending upwardly from a substantially horizontal bottom; a weigh rail rigidly secured at opposite ends to said support means whereby said weigh rail is free to deflect vertically as a load moves thereover; and a deflection sensing means disposed between said bottom and said weigh rail for sensing deflection of said weigh rail, said weigh rail being initially deflected to prestress said load sensing means.

9. A weigh rail assembly including: a support saddle, said support saddle having longitudinally spaced support means extending upwardly from a substantially horizontal bottom; a weigh rail rigidly secured at opposite ends to said support means whereby said weigh rail is free to deflect vertically as a load moves thereover; and a deflection sensing means disposed between said bottom and said weigh rail for sensing deflection of said weigh rail, said support saddle having longitudinally spaced laterally outwardly extending straddle legs for supporting the support saddle at longitudinally spaced positions, said support saddle being securable to a base by hold-down means engageable with the upper surfaces of said straddle legs.

10. A weigh rail assembly including: a support saddle, said support saddle having longitudinally spaced support means extending upwardly from a substantially horizontal bottom; a weigh rail rigidly secured at opposite ends to said support means whereby said weigh rail is free to deflect vertically as a load moves thereover; and a deflection sensing means disposed between said bottom and said weigh rail for sensing deflection of said weigh rail, said support saddle having longitudinally spaced laterally outwardly extending straddle legs for supporting the support saddle at longitudinally spaced positions, said weigh rail being initially deflected to prestress said load sensing means.

References Cited in the file of this patent

UNITED STATES PATENTS

| | | |
|---|---|---|
| 332,913 | Le Basteur et al. | Dec. 22, 1885 |
| 2,779,583 | Bone | Jan. 29, 1957 |
| 2,793,851 | Ruge | May 28, 1957 |
| 2,987,613 | Jefferson et al. | June 6, 1961 |
| 3,004,152 | Dyche | Oct. 10, 1961 |
| 3,009,056 | Bone et al. | Nov. 14, 1961 |
| 3,054,894 | Soule et al. | Sept. 18, 1962 |

FOREIGN PATENTS

| | | |
|---|---|---|
| 829,805 | Germany | Jan. 28, 1952 |

UNITED STATES PATENT OFFICE
CERTIFICATE OF CORRECTION

Patent No. 3,153,460                                    October 20, 1964

Seymour H. Raskin

It is hereby certified that error appears in the above numbered patent requiring correction and that the said Letters Patent should read as corrected below.

Column 2, line 66, for "supper" read -- upper --; column 4, line 58, for "and", first occurrence, read -- are --; column 7, line 5, for "lognitudinally" read -- longitudinally --.

Signed and sealed this 20th day of April 1965.

(SEAL)
Attest:

ERNEST W. SWIDER                                 EDWARD J. BRENNER
Attesting Officer                                      Commissioner of Patents